United States Patent
Lim et al.

(10) Patent No.: US 8,930,848 B2
(45) Date of Patent: Jan. 6, 2015

(54) METHOD FOR SELECTING AREA OF CONTENT FOR ENLARGEMENT, AND APPARATUS AND SYSTEM FOR PROVIDING CONTENT

(75) Inventors: Sang-Seok Lim, Suwon-si (KR); Pomaranski Michal, Warsaw (PL); Jin Ming, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 543 days.

(21) Appl. No.: 12/619,365

(22) Filed: Nov. 16, 2009

(65) Prior Publication Data

US 2010/0125808 A1 May 20, 2010

(30) Foreign Application Priority Data

Nov. 14, 2008 (KR) .................. 10-2008-0113605

(51) Int. Cl.
*G06F 3/048* (2013.01)
*G06F 3/14* (2006.01)
*G06F 3/0481* (2013.01)
*G06F 3/0488* (2013.01)

(52) U.S. Cl.
CPC .............. *G06F 3/048* (2013.01); *G06F 3/0481* (2013.01); *G06F 3/0488* (2013.01); *G06F 2203/04806* (2013.01)
USPC ............................ 715/800; 715/767; 715/864

(58) Field of Classification Search
USPC ........................................................ 715/800
See application file for complete search history.

(56) References Cited

U.S. PATENT DOCUMENTS

| | | | | | |
|---|---|---|---|---|---|
| 4,698,625 | A | * | 10/1987 | McCaskill et al. | 345/157 |
| 5,748,512 | A | * | 5/1998 | Vargas | 708/142 |
| 5,757,358 | A | * | 5/1998 | Osga | 715/862 |
| 5,805,157 | A | * | 9/1998 | Bertram et al. | 715/773 |
| 5,850,206 | A | * | 12/1998 | Kashiwagi | 345/418 |
| 5,926,824 | A | * | 7/1999 | Hashimoto | 715/210 |
| 6,023,265 | A | * | 2/2000 | Lee | 345/173 |
| 6,040,824 | A | * | 3/2000 | Maekawa et al. | 345/173 |
| 6,138,113 | A | * | 10/2000 | Dean et al. | 715/208 |
| 6,211,856 | B1 | | 4/2001 | Choi et al. | |
| 6,259,436 | B1 | * | 7/2001 | Moon et al. | 345/173 |
| 6,466,203 | B2 | | 10/2002 | Van Ee | |
| 2004/0107403 | A1 | | 6/2004 | Tetzchner | |
| 2006/0149726 | A1 | | 7/2006 | Ziegert et al. | |
| 2006/0170660 | A1 | * | 8/2006 | Miyata et al. | 345/173 |
| 2008/0007434 | A1 | | 1/2008 | Hristov | |
| 2008/0307362 | A1 | * | 12/2008 | Chaudhri et al. | 715/835 |
| 2009/0049408 | A1 | * | 2/2009 | Naaman et al. | 715/835 |

FOREIGN PATENT DOCUMENTS

| | | |
|---|---|---|
| EP | 0 878 754 | 11/1998 |
| EP | 1 847 915 | 10/2007 |
| GB | 2 434 286 | 7/2007 |
| WO | WO 00/38042 | 6/2000 |

(Continued)

*Primary Examiner* — Stephen Alvesteffer
(74) *Attorney, Agent, or Firm* — The Farrell Law Firm, P.C.

(57) ABSTRACT

A method for selecting an area of content for enlargement is provided. Content including a plurality of objects is displayed. A user's selection of an area is received and the selected area is identified. At least one object that crosses into the selected area is selected. An importance value of the at least one selected object is calculated considering a crossing range of the selected area and the at least one selected object. At least one to-be-displayed object is extracted based on the importance value. The at least one extracted object is displayed.

15 Claims, 5 Drawing Sheets

(56) References Cited

FOREIGN PATENT DOCUMENTS

| WO | WO 2004/070604 | 8/2004 |
| WO | WO 2007/082290 | 7/2007 |
| WO | WO 2008/030976 | 3/2008 |

\* cited by examiner

METHOD FOR SELECTING AREA OF CONTENT FOR ENLARGEMENT, AND APPARATUS AND SYSTEM FOR PROVIDING CONTENT

PRIORITY

This application claims priority under 35 U.S.C. §119(a) to a Korean Patent Application entitled "Method for Selecting Enlarged Area of Contents, Apparatus and System for Providing Contents" filed in the Korean Intellectual Property Office on Nov. 14, 2008 and assigned Serial. No. 10-2008-0113605, the content of which is incorporated herein by reference.

BACKGROUND OF THE INVENTION

1. Field of the Invention

The present invention relates generally to visual content browsing, and more particularly to a method and an apparatus for enlarging a partial area of content according to a user's request and displaying the enlarged partial area.

2. Description of the Related Art

U.S. Pat. No. 6,211,856 describes technology for zooming in on a collection of icons and allowing a user to select a desired feature in a display in which individual functions of each icon is recognizable.

US Patent Publication No. 2006/0149726 describes the segmentation of web pages for a mobile device.

U.S. Pat. No. 6,466,203 describes technology in which when a user touches a particular location on a touch screen that corresponds to a portion of the page's image, the portion is displayed so as to fill the display area.

US Patent Publication No. 2004/0107403 describes the reformatting of an HTML document by enforcing at least one client-side style sheet, thus adapting a width of the reformatted document to a width of a display, and presenting the reformatted document on the display.

The above-described technologies focus on the reformatting of an HTML page for display on a mobile device. However, these technologies are only applicable to zooming in on a web page, and present difficulties when applied to content other than web pages.

SUMMARY OF THE INVENTION

The present invention has been made to address at least the above problems and/or disadvantages and to provide at least the advantages described below. Accordingly, an aspect of the present invention provides an apparatus and a method capable of enlarging a partial area of various content, including a web page, and displaying the enlarged partial area.

According to one aspect of the present invention, a method is provided for selecting an area of content for enlargement. Content including a plurality of objects is displayed. A user's selection of an area is received and the selected area is identified. At least one object that crosses into the selected area is selected. An importance value of the at least one selected object is calculated considering a crossing range of the selected area and the at least one selected object. At least one to-be-displayed object is extracted based on the importance value. The at least one extracted object is displayed.

According to another aspect of the present invention, an apparatus is provided for providing content. The apparatus includes a display for displaying at least one of content or an object, in accordance with a size and resolution of a screen. The apparatus also includes a memory for storing content including a plurality of objects. The apparatus further includes a user input unit for identifying a partial area of the display selected by a user. The apparatus additionally includes a controller for selecting at least one object that crosses into the selected area on the display, calculating an importance value of the at least one selected object in accordance with a crossing range of the selected area and the at least one selected object, extracting at least one to-be-displayed object based on the importance value, and controlling an operation of the display.

According to a further aspect of the present invention, a system for providing content is provided. The system includes a content management server for managing content including a plurality of objects. The system also includes a portable terminal for receiving content through communication with the content management server. The content management server stores and manages the content, provides the content according to a request of the portable terminal, receives a selected area from the portable terminal, selects at least one object that crosses into the selected area, calculates an importance value of the at least one selected object in accordance with a crossing range of the selected area and the at least one selected object, extracts at least one to-be-displayed object based on the importance value, and transmits the at least one extracted object to the portable terminal. The portable terminal adjusts the content received from the content management server to a resolution for display of the content, receives a selection of an area from the user, identifies the selected area for transmission of data for the selected area to the content management server, and adjusts the at least one object received from the content management server to a resolution for display of the at least one adjusted object.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF THE EMBODIMENTS OF THE PRESENT INVENTION

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

If the size of a display window of a content providing apparatus is relatively small when compared with the size of the content, it may be difficult for the user to identify detailed information of objects included in the content. The embodiments of the present invention enlarge an area where an object having user-requested detailed information is located and display the enlarged area.

Figure 1:
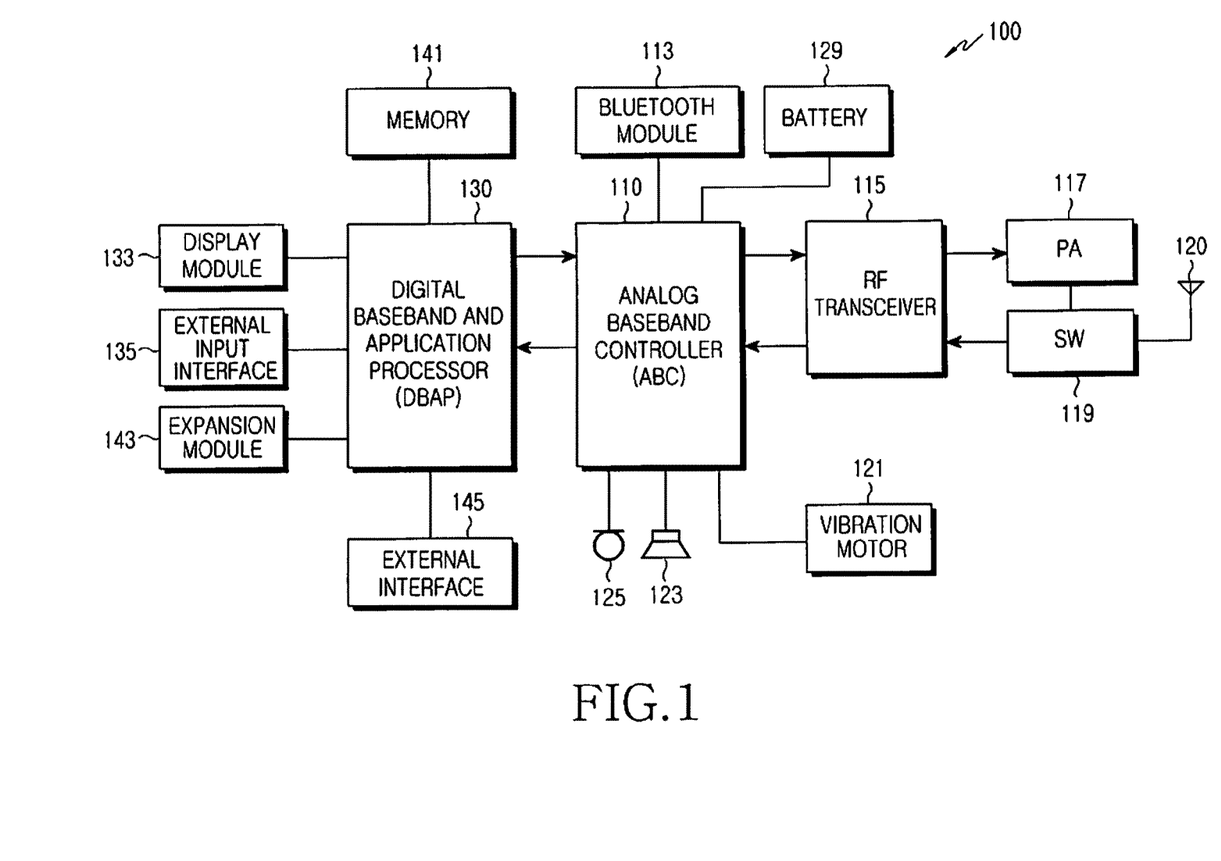
FIG. 1 is a block diagram illustrating a structure of a mobile communication terminal to which an apparatus for providing content is applied, according to an embodiment of the present invention.

FIG. 1 is a block diagram illustrating the structure of a mobile communication terminal to which an apparatus for providing content is applied, according to an embodiment of the present invention. Referring to FIG. 1, a mobile communication terminal 100 includes a display module 133, such as a Liquid Crystal Display (LCD) or a Light Emitting Diode (LED) display, an external input interface 135, a memory 141, and a Digital Baseband and Application Processor (DBAP) 130.

The DBAP 130 processes input, prepares display data, and executes a software program that controls the DBAP 130 in a conventional manner. The software program may include an application window program, a Graphic User Interface (GUI) program, a web browser program, or a document viewer program, for displaying the content via an operating system, a GUI, a web page, or a document. Further, the content includes a plurality of objects. The objects may include an image, a text box, a hyperlink, a moving image, etc.

The software program executed by the DBAP 130 enables operation of the mobile communication terminal 100 or provides externally input data (e.g. a web page) through the display module 133. The DBAP 130 also provides logic for receiving a user's selection of at least one object included in the content using a signal input from the external input interface 135.

For example, the external input interface 135 may be a keypad module or a touch screen module that identifies the location of a user contacting area using the change of high frequency, resistance or voltage, ultrasonic wave, etc., and generates location information (e.g. an axis) of the contacted area.

The software program can be stored within the DBAP 130 or in the memory 141 (e.g. flash memory) combined with the DBAP 130. The memory 141 can store the user's data, e.g., a moving image file, a voice file, a telephone number, etc. The DBAP 130 is also connected to a port for an expansion module 143 (e.g., a smart digital card, etc.) and an external interface 145 (e.g., a USB interface). The expansion module 143 can add additional functions to a system by, for example, storing software or data in games, a dictionary, or another useful specific module. The external interface 145 allows for the exchange of programs and/or data with another system.

The DBAP 130 is connected to an Analog Baseband Controller (ABC) 110 so as to exchange data or commands with the ABC 110. The ABC 110 processes the data from a cellular phone signal or data for the signal of a cellular phone, generates an audio signal for operating a speaker 123, and encodes audio input from a microphone 125. Further, the ABC 110 is combined with a Bluetooth module 113 that is operated based on a Bluetooth communication protocol, and sends data transmitted from the Bluetooth module 113 to the DBAP 130 or sends data received from the DBAP 130 to the Bluetooth module 113.

A battery 129 is combined with every element of the apparatus for providing power. Conventionally, the battery 129 is rechargeable and includes an input for being charged. The ABC 110 is combined with an RF transceiver 115 for the bi-directional exchange of data received through an antenna 120. The RF transceiver 115, a power amplifier 117, a switch 119, and the antenna 120 may be elements of a conventional cellular phone.

Further, the ABC 110 is combined with a vibration motor 121 and controls the operation of the vibration motor 121 based on a signal transmitted from the RF transceiver 115 or a signal received from the DBAP 130.

In particular, the DBAP 130 executes the application window program, GUI program, web browser program, document viewer program, etc., so as to display the content (e.g. the operation system, GUI, web page, document, etc.) including a plurality of objects. The user selects an area in which a specific object is located among the content displayed by the mobile communication terminal through the external input interface 135 (e.g. a touch screen module). The DBAP 130 identifies the selected area through the external input interface 135 and extracts at least one object included in the area so as to display the extracted object. The content may be externally input data or stored in the memory 141. Therefore, the DBAP 130 can request the medium (e.g. an external server or memory included in the mobile communication terminal) that stores the content for object extraction or for transmission of the extracted object.

The operation of selecting the area of the content for enlargement by the content providing apparatus according to embodiments of the present invention is described in greater detail below with reference to accompanying drawings.

Figure 2:
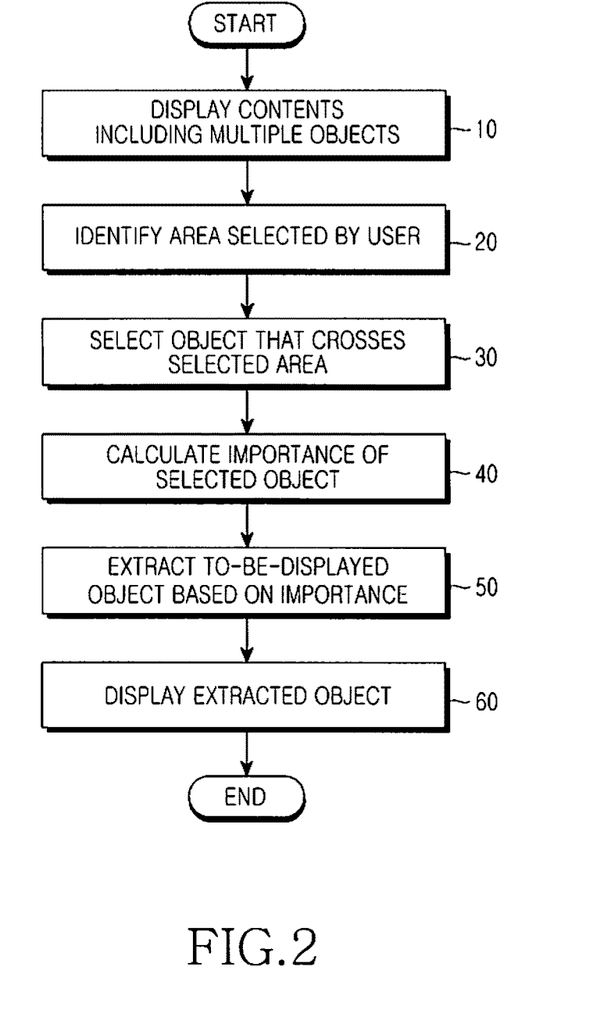
FIG. 2 is a flowchart illustrating a method for selecting an area of the content for enlargement, according to an embodiment of the present invention.
Figure 3A:
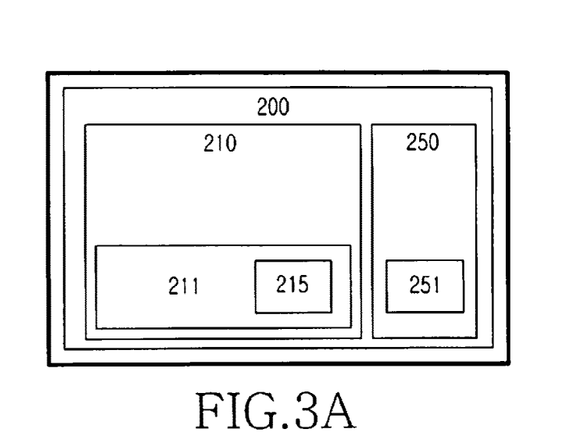
FIGS. 3A to 3F are diagrams sequentially illustrating display screens when selecting the area of the content for enlargement, according to an embodiment of the present invention.

FIG. 2 is a flowchart illustrating a method for selecting the area of the content for enlargement, according to an embodiment of the present invention. Referring to FIG. 2, in the method for selecting the area of the content for enlargement, the content, including a plurality of objects, is displayed through the display module in step 10. The content displayed in step 10 may include content (e.g. the operation system, GUI, etc.) fundamentally provided by the content providing apparatus or content (e.g. the web page, document, etc.) according to a user's request. For example, as shown in FIG. 3A, the content displayed in step 10 includes a first object 200, a second object 210, a third object 211, a fourth object 215, a fifth object 250, and a sixth object 251. The content can set a predetermined weight with respect to the plurality of objects 200, 210, 211, 215, 250, and 251. Further, in step 10, the DBAP 130 calculates information for the area in which the objects included in the content are located considering the size of the content, the size and resolution of the display screen, and temporarily stores the result in memory 141.

Figure 3B:
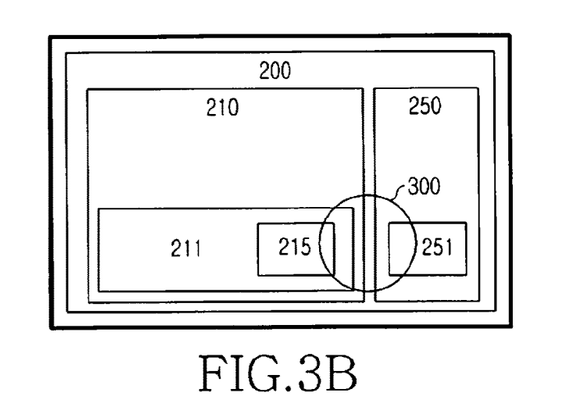

The user identifies the content displayed on the content providing apparatus and, if it is difficult for the user to identify the detailed information of objects included in the content, selects an area where the object having the user-requested detailed information is located using the external input interface 135 (e.g. the touch screen module) included in the content providing apparatus. FIG. 3B illustrates the display screen including a partial area 300 selected by the user in the content providing apparatus, according to an embodiment of the present invention.

In step 20, the DBAP 130 identifies an axis of the area 300 selected by the user through the external input interface 135. In step 30, the DBAP 130 refers to the area information of each object calculated in step 10 and selects all the objects which cross into the area 300 selected by the user. For example, the objects crossing into the area 300 selected by the user may include the second object 210, the third object 211, the fourth object 215, the fifth object 250, and the sixth object 251.

In step 40, the DBAP 130 calculates an importance value for the objects selected in step 30. The importance value can be calculated on the basis of the superposition ratio of the area 300 selected by the user and an area of the area 300 in which the selected object is located (the ratio of the selected area with respect to the crossing area of the object). The importance value can be obtained by Equation (1) below.

$$I(x) = \frac{A(x)}{E(x)} \quad (1)$$

Where x is a visual factor, I(x) is the importance value, A(x) is a width of the crossing area between the selected area and the object, and E(x) is a width of the area in which the objects are distributed. Further, it may be preferred that the importance value is calculated with respect to a predetermined weight of the respective objects. The importance is obtained by Equation (2) in below.

$$I(x) = \frac{A(x)}{E(x)} \alpha(T(x)) \quad (2)$$

Where α(T(x)) is a weight of the object of x-type (the weight according to the x-type).

The predetermined weight is described as the weight for the x-type object, but the embodiments of the present invention are not limited thereto and it is apparent that a person skilled in the art can modify the weight. For example, the predetermined weight can be set considering the importance value of the object within the content, the preference of the users, etc.

Table 1 represents the importance value of the objects calculated through step 40. Referring to Table 1, the importance value of the second object 210, the third object 211, the fourth object 215, the fifth object 250, and the sixth object 251 is calculated as 0.2, 0.3, 0.5, 0.3, and 0.8, respectively.

TABLE 1

| Object | α (T(x)) | A(x) | E(x) | I(x) |
|---|---|---|---|---|
| Object 2 | 1 | 200 | 1000 | 0.2 |
| Object 3 | 1 | 100 | 300 | 0.3 |
| Object 4 | 1 | 50 | 100 | 0.5 |
| Object 5 | 1 | 100 | 300 | 0.3 |
| Object 6 | 1 | 80 | 100 | 0.8 |

In step 50, the DBAP 130 extracts the to-be-displayed object using the importance value calculated in step 40. Preferably, in step 50, the median value (ρ) of the importance value of the objects can be used to extract the to-be-displayed object. For example, the objects (i.e., the fourth object 215, the sixth object 251) having an importance value of 0.4 or more are extracted as the to-be-displayed objects based on the median importance value of 0.4 for 5 objects 210, 212, 215, 250, and 251 selected in step 40. The objects (i.e., the second object 210, the third object 211, the fifth object 250) having an importance value less than 0.4 are removed.

Figure 3C:
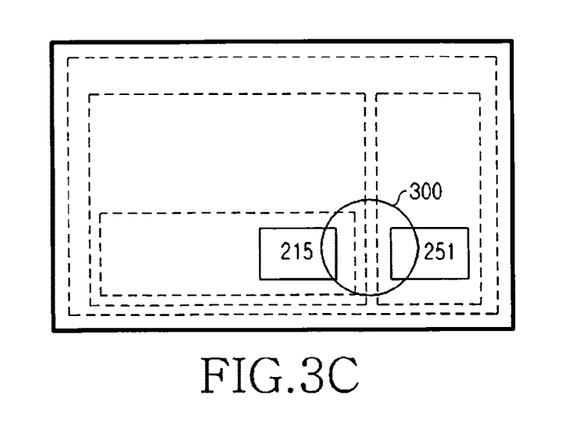

FIG. 3C illustrates the extracted objects 215 and 251 in the content providing apparatus, according to an embodiment of the present invention. The objects drawn with a dotted line are the removed objects and the objects drawn with a solid line are the objects extracted as to-be-displayed objects. The extraction of the to-be-displayed objects is performed in accordance with Equation (3) below.

$$ACC = \{\forall x : I(x) \geq \rho\}$$

$$REJ = \{\forall x : I(x) < \rho\} \quad (3)$$

Where ACC represents a set of the to-be-displayed objects, and REJ represents a set of the to-be-removed objects in the display.

Figure 3D:
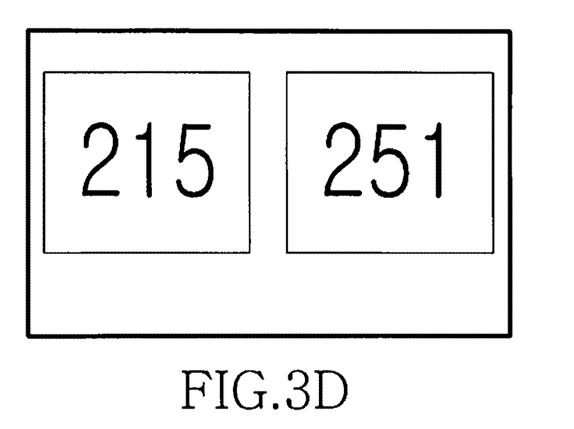

Finally, in step 60, the DBAP 130 provides the display module 133 with the objects 215 and 251 extracted in step 50. The DBAP 130 controls the display module 133 and displays the extracted objects 215 and 251 considering the screen size and resolution of the display module 133. The screen displayed in step 60 is shown in FIG. 3D.

Figure 3E:
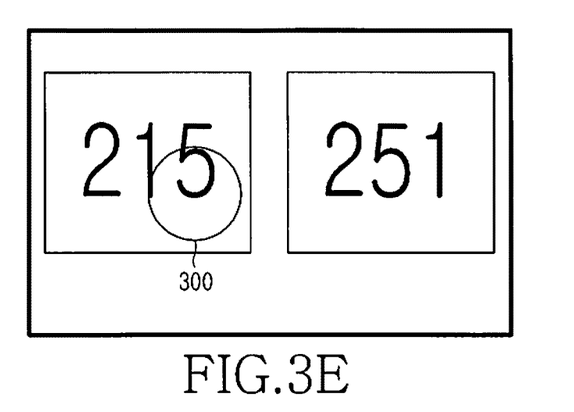
Figure 3F:
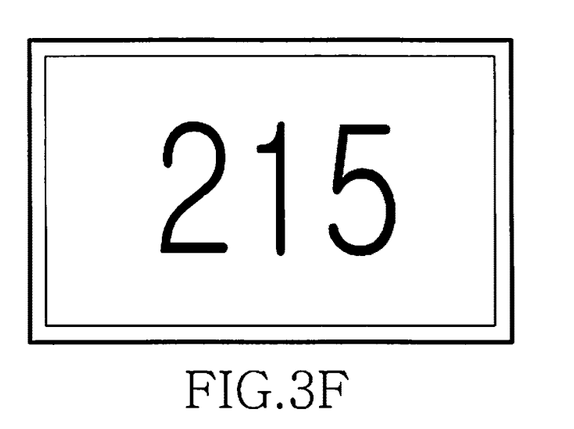

Further, the DBAP 130 can newly construct the content only including objects 215 and 251 extracted in step 50, provide the display module with the newly constructed contents, and control the display of the newly constructed content. In addition, when the user selects a partial area of the display screen again in the screen displaying the extracted object 215 and 251, aforementioned steps 20 to 60 can be repeatedly performed. For example, when the user selects a partial area in the display screen shown in FIG. 3D again as shown in FIG. 3E, the external input interface 133 identifies the selected area and the DBAP 130 extracts the to-be-displayed object 215 again through steps 30 to 60. The DBAP 130 provides the display module 133 with the re-extracted object 215 and controls the display module 133 for displaying the re-extracted object 215 on the screen as shown in FIG. 3F.

As such, according to an embodiment of the present invention, the method for enlarging the partial area of the content by the content providing apparatus is provided. Alternatively, considering storage capacity and data processing speed of the portable terminal, a system can be implemented in which certain components of the content providing apparatus are configured in the portable terminal, and a server providing content directly extracts a certain object among the objects included in the content so as to transmit the extracted object to the portable terminal.

The operation of the content providing system according to another embodiment of the present invention is described below with reference to the accompanying drawing.

Figure 4:
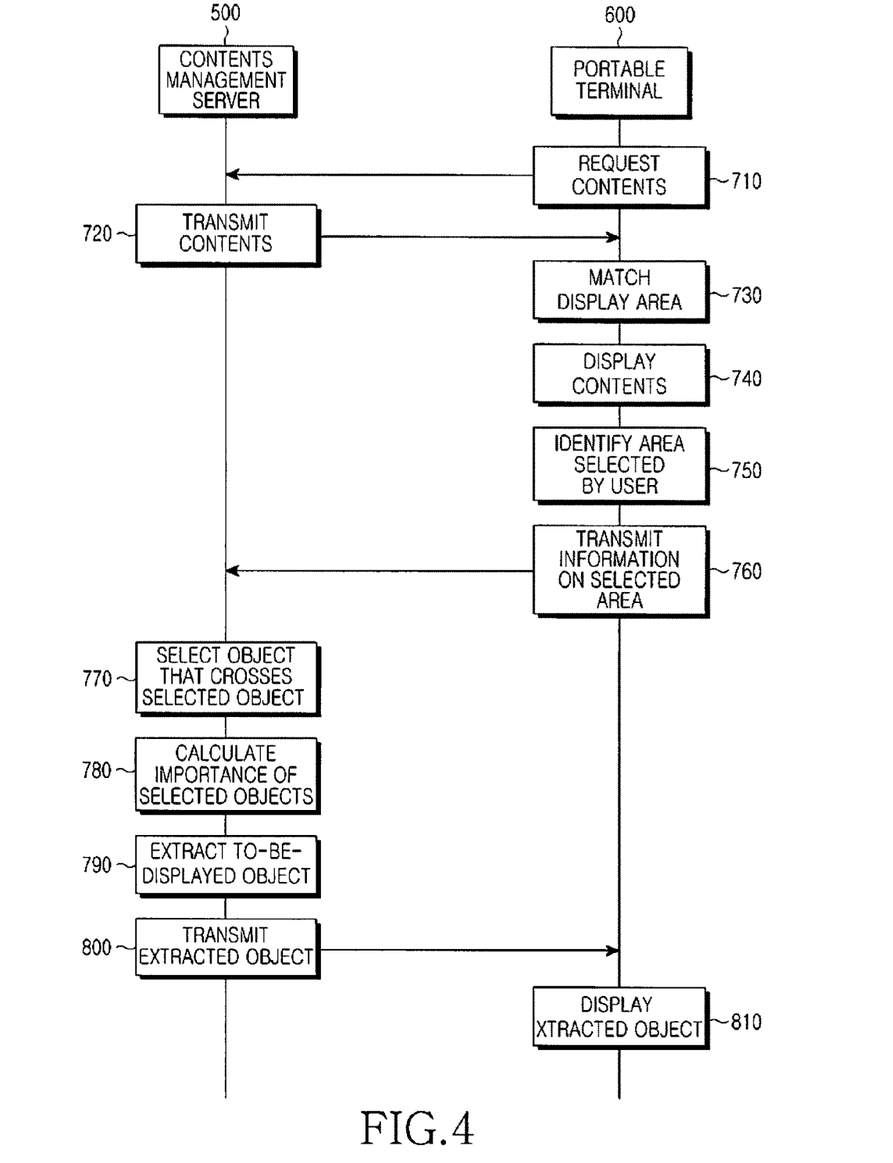
FIG. 4 is a flowchart illustrating a method for operating a system for providing content, according to an embodiment of the present invention.

FIG. 4 is a flowchart illustrating a method for operating a system for providing content, according to an embodiment of the present invention. Referring to FIG. 4, the content providing system includes a content management server 500 and a portable terminal 600.

First, in step 710, the portable terminal 600 connects to the content management server 500 and requests the provision of the predetermined content (e.g. the web page). In step 720, the content management server 500 provides the portable terminal 600 with the content requested by the portable terminal 600.

In step 730, the portable terminal 600 matches the size and resolution of the received content to the size and resolution of the display screen included in the portable terminal. Therefore, the portable terminal 600 calculates the axis of the area in which the object included in the content is located and temporarily stores the calculated axis in a storage medium, such as a memory. The portable terminal 600 displays the received content as shown in FIG. 3A in step 740.

If the user selects the partial area 300 as shown in FIG. 3B using the external input interlace (e.g. the touch screen module) mounted on the portable terminal 600, the portable terminal 600 identifies the partial area 300 selected by the user in step 750.

In step 760, the portable terminal 600 transmits information on the selected area 300 to the content management server 500. The information on the selected area 300 can include matching information of the areas obtained in step 730.

The content management server 500 selects the objects which cross into the selected area 300 with reference to the location of the selected area 300 and the matching information of the area in step 770. Then, the content management server 500 calculates the importance value of the selected objects in step 780, extracts the to-be-displayed object in step 790, so as to transmit the extracted object to the portable terminal 600. Steps 770 and 780 are performed in the same manner as steps 40 and 50 in FIG. 2.

The extracted object is transmitted from the content management server 500 to the portable terminal 600 in step 800. The portable terminal 600 displays the extracted object received from the content management server 500 considering the size and resolution of the display screen mounted on the portable terminal in step 810.

As such, the apparatus, method, and system for providing the content according to the embodiments of the present invention are more efficient on current applications due to the fact that it solves the inaccuracy of the conventional touch screen and the visual layout. Further, the apparatus, method, and system for providing the content according to the embodiments of the present invention can be widely applied to various fields, which include the enlargement of a web page. In this field, the present invention allows for the consideration of factors other than a division or a section in an HTML document (DIV). For example, on a web page, enlargement of small links on a button of a page is provided in a more intuitive scheme than other conventional algorithms.

The present invention can enlarge a partial area of various content or applications and provide the enlarged partial area, in consideration of the inaccuracy of touch screen and the visual layout.

Further, considering the demand and preference of the user, the present invention can enlarge a partial area of various content or applications and provide the enlarged partial area.

The method for providing the content can be implemented as a computer-readable code in a computer-readable recording medium. The computer-readable recording medium includes every type of recording apparatus in which the data capable of being read by the computer system is stored. The computer-readable recording medium includes, for example, ROM, RAM, CD-ROM, magnetic tape, floppy disc, optical disc, etc., and also includes the implementation in the form of the carrier wave (e.g. transmission through the Internet). Further, the computer-readable recording medium is distributed in the network-connected computer system so as to be stored and executed as a computer-readable code in a distribution scheme.

While the present invention has been shown and described with reference to certain embodiments and drawings thereof, it will be understood by those skilled in the art that various changes in form and details may be made therein without departing from the spirit and scope of the invention as defined by the appended claims.

What is claimed is:

1. A method for selecting an area of content for enlargement, the method comprising the steps of:
    displaying the content comprising a plurality of objects;
    receiving a user's selection of an area of the content, and identifying the selected area;
    selecting a plurality of objects that cross into the selected area;
    calculating an importance value of each of the selected objects in accordance with a crossing range of the selected area and the selected objects, wherein the importance value of each selected object is obtained by calculating a ratio of the selected area and an area of the selected object included within the selected area;
    calculating a median value of the importance values of the selected objects;
    determining at least one to-be-displayed object from among the selected objects having an importance value at least equal to the calculated median value;
    extracting the determined at least one to-be-displayed object; and
    displaying the at least one extracted object.

2. The method as claimed in claim 1, wherein extracting the at least one to-be-displayed object comprises:
    calculating a reference value for the importance value; and
    extracting the at least one to-be-displayed object having an importance value that is greater than or equal to the reference value.

3. The method as claimed in claim 1, wherein displaying the at least one extracted object comprises combining the at least one extracted object and re-constructing to-be-displayed content.

4. The method as claimed in claim 1, wherein displaying the at least one extracted object comprises adjusting a size of the at least one extracted object to a size of a display, in accordance with a size and a resolution of the display, so as to display the at least one extracted object.

5. The method as claimed in claim 1, wherein the at least one object has a predetermined weight and the importance value is obtained by multiplying the predetermined weight by the ratio of the selected area and an area of the selected object included within the selected area.

6. An apparatus for providing content, comprising:
    a display for displaying at least one of the content and an object, in accordance with a size and resolution of a screen;
    memory for storing content comprising a plurality of objects;
    a user input unit for identifying a partial area of the display selected by a user; and
    a controller for selecting a plurality of objects that cross into the selected area on the display, calculating an importance value of each of the selected objects in accordance with a crossing range of the selected area and the selected objects, calculating a median value of the importance values of the selected objects, determining at least one to-be-displayed object from among the selected objects having an importance value at least equal to the calculated median value, extracting the determined at least one to-be-displayed object, and controlling an operation of the display to display the extracted at least one to-be-displayed object,
    wherein the controller obtains the importance value of each selected object by calculating a ratio of the selected area and an area of the selected object included within the selected area.

7. The apparatus as claimed in claim 6, wherein the memory stores browser program data for displaying the content, and the controller controls the display of the content via a calculation of the browser program data.

8. The apparatus as claimed in claim 6, wherein the controller calculates a reference value for the importance value and extracts the at least one object having an importance value that is greater than or equal to the reference value as the at least one to-he-displayed object.

9. The apparatus as claimed in claim 6, wherein the controller combines the at least one extracted object to re-construct to-be-displayed content.

10. The apparatus as claimed in claim 6, wherein the display unit adjusts a size of the at least one extracted object to a size of a display screen to display the at least one extracted object.

11. The apparatus as claimed in claim 6, wherein the memory stores a predetermined weight for the at least one object and the controller multiplies the predetermined weight by the ratio of the selected area and an area of the selected object included within the selected area to calculate the importance value.

12. A system for providing content, comprising:
a content management server for managing content including a plurality of objects; and
a portable terminal for receiving content through communication with the content management server,
wherein the content management server stores and manages the content, provides the content according to a request of the portable terminal, receives a selected area from the portable terminal, selects a plurality of objects that cross the selected area, calculates an importance value of each of the selected objects in accordance with a crossing range of the selected area and the selected objects, calculates a median value of the importance values of the selected objects, determines at least one to-be-displayed object from among the selected objects having an importance value at least equal to the calculated median value, extracts the determined at least one to-be-displayed object, and transmits the extracted at least one extracted object to the portable terminal, and
the portable terminal adjusts the content received from the content management server to a resolution for display of the content, receives a selection of an area from the user, identifies the selected area for transmission of data of the selected area to the content management server, and adjusts the at least one object received from the content management server to a resolution for display of the at least one adjusted object,
wherein the importance value of each selected object is obtained by calculating a ratio of the selected area and an area of the selected object included within the selected area.

13. The system as claimed in claim 12, wherein the at least one object has a predetermined weight and the importance value is obtained by multiplying the predetermined weight by the ratio of the selected area and an area of the selected object included within the selected area.

14. A method for selecting an area of content for enlargement, the method comprising the steps of:
displaying the content comprising a plurality of objects;
receiving a user's selection of an area of the content, and identifying the selected area;
selecting a plurality of objects that cross into the selected area;
calculating an importance value of each of the selected objects in accordance with a crossing range of the selected area and the selected object and a predetermined weight for each of the selected objects, wherein the importance value of each selected object is obtained by calculating a ratio of the selected area and an area of the selected object included within the selected area;
determining at least one to-be-displayed object based on the calculated importance values; and
displaying the at least one to-be-displayed object,
wherein the predetermined weight is set according to at least one of type of each object, the importance value of each object, and a user preference of each object.

15. An apparatus for providing content, comprising:
a display for displaying the content comprising a plurality of objects in accordance with a size and resolution of a screen;
memory for storing content including a plurality of objects and a plurality predetermined weights that are set for each object according to at least one of type of each object, an importance value of each object, and a user preference corresponding to each object;
a user input unit for identifying a user-selected area that is a portion of an area the display; and
a controller for selecting a plurality of objects that cross into the selected area on the display, calculating importance values of each of the selected objects according to a crossing range of the selected area and areas of the selected objects and according to predetermined weights of each selected object, determining at least one to-be-displayed object based on the calculated importance values, and controlling an operation of the display to display the at least one to-be-displayed object,
wherein the controller obtains the importance value of each selected object by calculating a ratio of the selected area and an area of the selected object included within the selected area.

* * * * *